United States Patent [19]

Takamatsu

[11] Patent Number: 4,946,638
[45] Date of Patent: Aug. 7, 1990

[54] SLUSH MOLDING METHOD AND APPARATUS THEREFOR

[75] Inventor: Shigeki Takamatsu, Toyota, Japan

[73] Assignee: Toyota Jidosha Kabushiki Kaisha, Toyota, Japan

[21] Appl. No.: 173,166

[22] Filed: Mar. 25, 1988

[30] Foreign Application Priority Data

Mar. 26, 1987 [JP]    Japan .................................. 62-72281

[51] Int. Cl.$^5$ ............................................. B29C 41/18
[52] U.S. Cl. ................................... 264/302; 249/137; 264/309; 264/310; 264/DIG. 60; 425/186; 425/435; 425/454
[58] Field of Search ........................... 425/425, 90–95, 425/269–275, 453–455, 186, 435, 182, 183, 185; 264/299, 301–305, 310, 311, 245, 309, DIG. 60; 249/108, 137, 161

[56] References Cited

U.S. PATENT DOCUMENTS 4,606,868  8/1986  Christoph et al. .................. 264/301

FOREIGN PATENT DOCUMENTS

| 227083 | 7/1987 | European Pat. Off. | ............ 425/435 |
| 60-157818 | 8/1985 | Japan | .................... 264/299 |
| 61-24419 | 2/1986 | Japan | .................... 425/269 |
| 62-253417 | 11/1987 | Japan | .................... 264/302 |

Primary Examiner—Jeffery Thurlow
Assistant Examiner—Mathieu Vargot
Attorney, Agent, or Firm—Finnegan, Henderson, Farabow, Garrett and Dunner

[57] ABSTRACT

A slush molding method including the steps of preparing a mold with a groove provided on the entire periphery of the opening portion thereof, engaging a heating medium guard frame with the groove, charging a resin material into the mold, heating the mold into the heating medium which is contained in a fluidized-bed oven and fluidized by air so as to melt the resin and cause it to adhere to the molding surface and removing the heating medium guard frame to discharge the surplus resin. An apparatus used for the slush molding method is also included.

4 Claims, 2 Drawing Sheets

SLUSH MOLDING METHOD AND APPARATUS THEREFOR

BACKGROUND OF THE INVENTION

1. Field of the Invention

The present invention relates to the improvement of a slush molding method and an apparatus therefor.

2. Description of the Prior Art

A slush molding method is a method of causing a resin in the state of sol or powder to adhere to the molding surface of a heated mold, forming a molten resin layer by removing the surplus resin, cooling and solidifying the resin, and removing the molded product from the mold. This method is suitable for the production of a molded product having a complicated shape. In this method, a fluidized-bed heating oven such as that described in Japanese Patent Laid-Open No. 139410/1985 as considered to be suitable as a heating means. More preferably, there is a slush molding apparatus such as the apparatus 10' shown in FIGS. 3 and 4 which is composed of a fluidized-bed oven 6 including a heating medium 7 and a mold dipping device 3 for dipping a mold 1. The fluidized-bed oven 6 of the slush molding apparatus 10' is filled with a heating medium 7 such as alumina beads, zircon sand and glass beads, and the heating medium 7 is heated by a heater 8 in the oven 6 and is fluidized by the air 9 introduced by a pipe provided in another chamber (not shown). The mold dipping device 3 has a chucking means for holding the mold 1 and a synchronous frame 4 to which a lid 11 is welded and which is so designed as to be situated above the mold 1 at the time of dipping the mold 1.

When a resin is subjected to slush molding by using the apparatus 10', the mold 1 charged with the resin in the state of powder or sol and conveyed to the apparatus 10' is chucked by the chucking means of the mold dipping device 3, and is dipped into the heating medium 7 and heated. After the molding surface of the mold 1 is covered with the molten resin, the surplus resin is discharged, and the solidified molded product is released from the mold 1.

In the above-described slush molding method, however, the heating medium 7 which is blown by the air 9 often enters the mold 1, because the mold 1 is lowered down to the vicinity of the upper surface of the heating medium 7 when the mold 1 is dipped into the heating medium in the oven 6. If the heating medium 7 enters the mold 1, the heating medium 7 adheres to the surface of the molded product, resulting in the production of a defective. Therefore, whenever the heating medium 7 enters the mold 1, the operation must be suspended to remove the heating medium 7, thereby greatly lowering the productivity.

As a measure for preventing the heating medium 7 from flying, the amount of air is reduced. The reduction in the amount of air, however, is disadvantageous in that it varies the temperature of the mold 1 too widely to preserve the uniformity of the molten state of the resin, thereby bringing about a problem of defective melting.

SUMMARY OF THE INVENTION

Accordingly, it is an object of the present invention to eliminate the above-described problems in the prior art and to provide a slush molding method which is capable of preventing a heating medium from entering a mold without reducing the amount of air.

It is another object of the present invention to provide an apparatus used for such a slush molding method.

To achieve this aim, in one aspect of the present invention there is provided a slush molding method comprising the steps of: preparing a mold with a groove provided on the entire outer periphery of the opening portion thereof; engaging the bottom portion of the heating medium guard frame surrounding the opening portion with the groove in such a manner as to be vertically movable; charging a resin material into the mold; dipping the mold in a fluidized-bed oven in the state in which the heating medium guard frame is lowered into the groove; heating the mold so as to melt the resin and cause the molten resin to adhere to the molding surface; taking the mold out of the oven and lifting the heating medium guard frame within the groove; discharging the surplus resin; and cooling the mold.

In another aspect of the present invention, there is provided a slush molding apparatus comprising: a mold which has a groove provided on the periphery of the opening portion thereof and a heating medium guard frame surrounding the opening portion and having the bottom portion vertically movably engaged with the groove; a fluidized-bed oven accomodating a heating medium; and a mold dipping device for dipping the mold into the heating medium in the fluidized-bed oven. The heating medium guard frame is composed of a material such as a metal and has an adequately large height measured from the upper surface of the heating medium, namely, a height large enough to prevent the blown heating medium from entering the mold. The height can therefore be appropriately determined in accordance with the kind of the heating medium, the amount of fluidizing air, and the like. The heating medium guard frame goes up and down under the weight of its own gravity in a later-described embodiment of the present invention, but it may be vertically moved by a cylinder or the like. It is thereby possible to remove the heating medium guard frame from the groove and lift it when the surplus resin is discharged after the resin film is formed on the inner surface of the mold. A lid may be provided at the upper end of the heating medium guard frame.

The mold dipping device of a slush molding apparatus used for the method of the present invention may be provided with a chucking means for chucking the mold so as to dip it into the heating medium and a synchronous frame which is so designed as to be situated above the mold at the time of dipping the mold. In this case, the heating medium guard frame has such a height as to reach the position of the synchronous frame.

According to the slush molding method of the present invention, since the upper portion of the opening portion of the mold is surrounded by the heating medium guard frame while the mold is heated, the heating medium which is fluidized by air scarcely enters the mold.

The above and other objects, features and advantages of the present invention will become clear from the following description of the preferred embodiments thereof, taken in conjuction with the accompanying drawings.

DESCRIPTION OF THE PREFERRED EMBODIMENTS

The present invention will be explained more in detail with reference to an embodiment of a slush molding apparatus.

Figure 1:
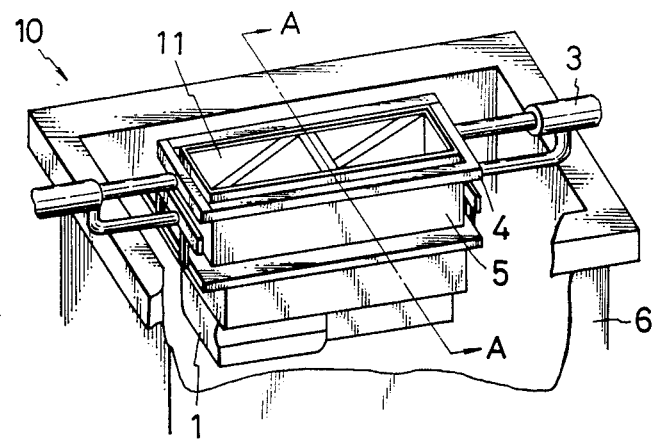
FIG. 1 is a perspective view of an embodiment of a slush molding apparatus according to the present invention.
Figure 2:
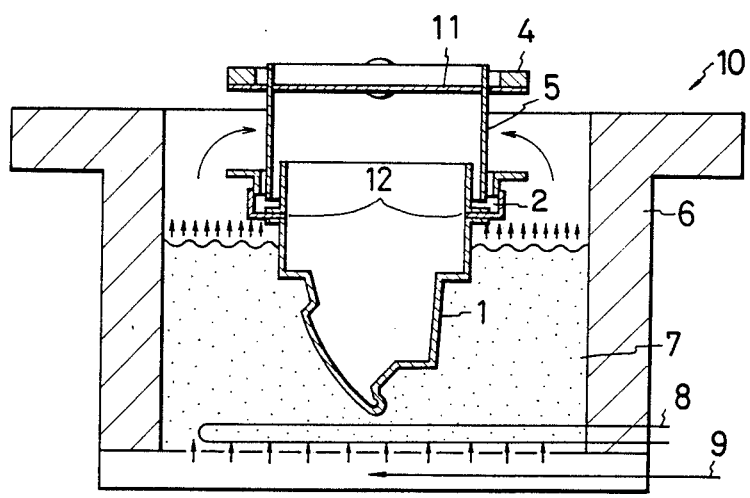
FIG. 2 is a sectional view of the embodiment shown in FIG. 1, taken along the line A—A.
Figure 3:
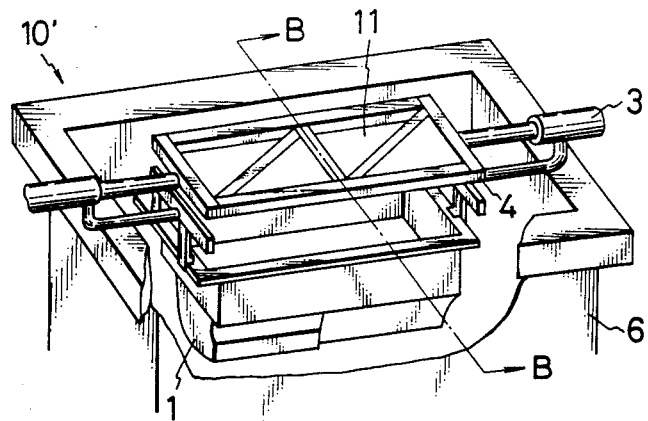
FIG. 3 is a perspective view of a slush molding apparatus used in a conventional method.
Figure 4:
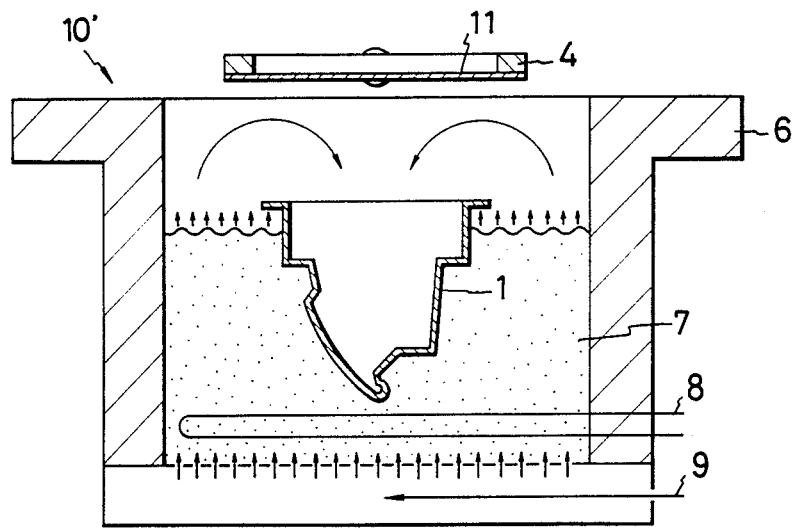
FIG. 4 is a sectional view of the apparatus shown in FIG. 3, taken along the line B—B.

As shown in FIG. 1 and FIG. 2 which is a sectional view of the slush molding apparatus shown in FIG. 1, taken along the line A—A, a slush molding apparatus 10 of the present invention is composed of a mold 1, a fluidized-bed oven 6, a mold dipping device 3 and a heating medium guard frame 5. A groove 2 is provided on the outer periphery of the upper portion 12 of the mold 1 in such a manner as to surround the entire periphery of the upper portion 12 of the mold 1. The portion of the upper portion 12 above the groove 2 is surrounded by the heating medium guard frame 5. A lid 11 is welded to the upper end of the heating medium guard frame 5.

An embodiment of a slush molding method of the present invention will now be explained. The mold 1 charged with a resin and conveyed to the position of the slush molding apparatus 10 is chucked by the chucking means of the mold dipping device 3, and the heating medium guard frame 5 is lowered until the bottom portion thereof is engaged with the groove 2. The mold 1 is dipped into the heating medium 7 and heated by fluidizing the heating medium 7 by air so as to melt the resin in the mold and causing it to adhere to the molding surface.

The rate of inclusion of heating medium and the rate of defective melting in the method of the present invention and the productivity thereof were compared with those of a conventional method. The results are shown in the following table.

|  | Conventional method | Embodiment |
| --- | --- | --- |
| Heating condition |  |  |
| Temperature of fluidized-bed oven | 330° C. | 330° C. |
| Pressure of air | 3.0 kg/cm² | 3.0 kg/cm² |
| Amount of air | 150 Nm²/h | 200 Nm²/h |
| Heating time | 45 sec | 45 sec |
| Effect |  |  |
| Rate of inclusion of heating medium | 20% | 0.3% |
| Rate of defective melting | 5% | 0.1% |
| Productivity | 3,800 cycles/month | 4,800 cycles/month |

As is obvious from the table, in a slush molding method according to the present invention, there is a very low possibility of a heating medium entering a mold. the possibility is lower than that in a conventional method in which the amount of air is reduced to prevent the inclusion of a heating medium. In addition, the rate of defective melting is reduced and the productivity is enhanced.

If the heating medium guard frame is integrally provided with the mold, the workability is deteriorated when the product is released from the mold. It is therefore essential in the present invention that the heating medium guard frame is removably provided on the mold.

If the heating medium guard frame is provided with a lid, the heat-shielding effect is obtained, thereby enabling the efficient use of the heating medium and increasing the advantages of the present invention.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A slush molding method comprising the steps of:
    preparing a mold having side portions and a bottom portion with a groove provided around the outer periphery of the side portions thereof;
    engaging the bottom portion of a heating medium guard frame with said groove in such a manner as to be vertically movable;
    charging a resin material into said mold;
    dipping said mold in a fluidized-bed oven with said heating medium guard frame engaged with said groove to prevent heating media from entering said mold;
    heating said mold to melt and resin and cause said resin to adhere to the molding surface;
    taking said mold out of said oven and removing said heating medium guard frame from said groove;
    discharging the surplus resin; and
    cooling said mold.

2. A method according to claim 1, wherein said heating medium guard frame is vertically moved by a cylinder.

3. A slush molding apparatus comprising:
    a mold having side portions and a bottom portion, said side portions having a groove around the outer periphery thereof;
    a fluidized-bed oven containing heating medium therein;
    a heating medium guard frame engageable with said groove; and
    a mold dipping device to dip the mold in the heating medium of the fluidized-bed oven; wherein said heating medium guard frame is engaged with said groove prevents heating media from entering said mold when said mold is dipped in the heating medium of the fluidized-bed oven.

4. An apparatus according to claim 3, further comprising a means for vertically moving said heating medium guard frame so as to engage said heating medium guard frame with said groove and remove said heating medium guard frame from said groove.

* * * * *